United States Patent
Blom et al.

(10) Patent No.: US 12,294,401 B2
(45) Date of Patent: May 6, 2025

(54) UNDERWATER WEARABLE DEVICE, COMMUNICATION SYSTEM COMPRISING THE SAME AND COMMUNICATION METHOD

(71) Applicant: Nederlandse Organisatie voor toegepast-natuurwetenschappelijk onderzoek TNO, The Hague (NL)

(72) Inventors: Koen Cornelis Hubertus Blom, The Hague (NL); Paul Louis Maria Joseph Van Neer, Bergschenhoek (NL); Mark Kevan Prior, The Hague (NL); Henry Simon Dol, Capelle aan den IJssel (NL); Jan-Laurens Pieter Jacobus Van Der Steen, Eindhoven (NL)

(73) Assignee: Nederlandse Organisatie voor toegepast-natuurwetenschappelijk onderzoek TNO, The Hague (NL)

( * ) Notice: Subject to any disclaimer, the term of this patent is extended or adjusted under 35 U.S.C. 154(b) by 211 days.

(21) Appl. No.: 17/923,370

(22) PCT Filed: May 17, 2021

(86) PCT No.: PCT/NL2021/050317
§ 371 (c)(1),
(2) Date: Nov. 4, 2022

(87) PCT Pub. No.: WO2021/235932
PCT Pub. Date: Nov. 25, 2021

(65) Prior Publication Data
US 2023/0208465 A1   Jun. 29, 2023

(30) Foreign Application Priority Data
May 18, 2020  (EP) .................................... 20175241

(51) Int. Cl.
H04B 13/02 (2006.01)
H04B 1/3827 (2015.01)

(52) U.S. Cl.
CPC ............. *H04B 1/385* (2013.01); *H04B 13/02* (2013.01)

(58) Field of Classification Search
CPC ................................ H04B 1/385; H04B 13/02
See application file for complete search history.

(56) References Cited

U.S. PATENT DOCUMENTS 9,668,041 B2 * 5/2017 Vavrus ...................... H04R 1/44
10,227,116 B2   3/2019 Lindman
(Continued)

OTHER PUBLICATIONS

European Patent Office, International Search Report in corresponding International Application No. PCT/NL2021/050317, dated Jul. 23, 2021 (3 pages).

*Primary Examiner* — Isam A Alsomiri
*Assistant Examiner* — Abdallah Abulaban
(74) *Attorney, Agent, or Firm* — Leydig, Voit & Mayer, Ltd.

(57) ABSTRACT

A communication system (1) comprising a first and a second underwater wearable device to be worn by a swimmer at mutually distant locations is disclosed herein. The communication system is configured to derive information pertaining to the swimmer from properties of a version of the acoustic signal transmitted from a first communication module of the first underwater wearable device to a second communication module of the second underwater wearable device.

16 Claims, 9 Drawing Sheets

(56) References Cited

U.S. PATENT DOCUMENTS

| | | | |
|---|---|---|---|
| 2009/0279389 A1* | 11/2009 | Irie | G01S 7/003 |
| | | | 367/118 |
| 2014/0348367 A1 | 11/2014 | Vavrus et al. | |
| 2016/0259029 A1* | 9/2016 | Jukkala | B63B 22/16 |
| 2017/0183068 A1* | 6/2017 | Lindman | G01S 5/0226 |

* cited by examiner

UNDERWATER WEARABLE DEVICE, COMMUNICATION SYSTEM COMPRISING THE SAME AND COMMUNICATION METHOD

CROSS-REFERENCE TO RELATED APPLICATIONS

This patent application is a U.S. National Phase of PCT International Application No. PCT/NL2021/050317, filed May 17, 2021, which claims priority to European Application No. 20175241.7, filed May 18, 2020, which are both expressly incorporated by reference in their entireties, including any references contained therein.

BACKGROUND

Field

The present disclosure relates to an improved underwater wearable device.

The present disclosure further relates to a communication system comprising an improved underwater wearable device.

The present disclosure still further relates to a communication method that uses an alternative communication technology to facilitate measurements.

Prior Art

Wearable electronic devices, such as smartwatches, and exercise wristbands are widely used as an aid to monitor various parameters, such as performance measures, e.g. a running speed, a traversed distance and physiological parameters, e.g. a heart rate. Typically such device uses electromagnetic signal transmission means. Communication for commonly available devices are typically not suitable for use by swimmers or divers as electromagnetic signal transmission is severely hampered in water.

US2018/0090970 A1 discloses technology intended for such purposes. The device uses an inductive coil for charging in a first operational mode and for transmitting and receiving communication signals in a second operational mode.

US 2009/279389 A1 discloses an ultrasonic signal communication device that has an ultrasonic oscillation unit that has at least two resonance frequencies according to the oscillation mode, a transmission unit that generates a first ultrasonic signal at one of the two resonance frequencies and transmits the generated first ultrasonic signal from the ultrasonic oscillation unit, and a reception unit that receives from the ultrasonic oscillation unit a second ultrasonic signal that is transmitted at the other of the two resonance frequencies.

US 2014/348367 A1 discloses a system for monitoring and directing athletic or other physical activities is disclosed. In one embodiment of the invention, a headset worn by an athlete includes one or more sensors, a microprocessor, a non-volatile memory and a communication link. The athlete's headset receives and transmits signals to a coach while the athlete is performing an activity. In one implementation, the system includes a underwater communication link for communication with a swimmer while in the water.

Whereas the technology may be suitable for communication, it would require separate means for measurement of user-related parameters such as a velocity relative to the water, a depth in the water etc.

SUMMARY

It is an object of the present invention to provide an improved underwater wearable device, communication system and communication method that uses an alternative communication technology that facilitates measurement of swimmer or diver related parameters.

In accordance with this object, a communication system is provided that comprises a first communication module and a second communication module of which are both provided as a component of a respective underwater wearable device. The predicate "underwater wearable device" is used herein to indicate that the device is suitable for long during operation when submerged in water. E.g. its operation should at least be guaranteed for a few hours but preferably for years. The device should be wearable in that its weight does not exceed a reasonable limit, for example a weight of not more than 1 kg, but preferably substantially lower, e.g. less than 200 mg. An underwater wearable device may for example be provided as a brace to be worn around the wrist or the ankle, a headband or a swimming suit. Whereas an underwater wearable device as provided herein is primarily intended for us in water, e.g. by swimmers or divers, it is further conceivable that an underwater wearable device, e.g. in the form of a smart watch, is also applied for daily use.

The first communication module provided as a component of the underwater wearable device comprises a signal source configured to provide an input signal to be transmitted and a transmitter configured to convert the input signal into a transmission signal suitable for transmission in water and to transmit the same.

The second communication module, also a component of an underwater wearable device, comprises a receiver configured to receive an external signal and to convert the received external signal into a processable signal and a signal processor configured to process the processable signal.

The transmitter of the first communication module is an acoustic transmitter that is configured to transmit an acoustic transmission signal and in the receiver of the second communication module is an acoustic receiver that is configured to receive an external acoustic signal. In this way not only a signal can be efficiently transmitted in underwater conditions, but also various swimmer related parameters can be determined by measuring characteristics of the transmitted signal, such as a transmission delay, signal distortions and signal reflections. The respective underwater wearable devices each with their respective communication module are carried at mutually different parts of a swimmers body Additionally the communication system may for example comprise one or more fixed communication modules, for example arranged in a swimming pool. A first and a second communication module may be combined into a combined communication module, for example in a underwater wearable device. Two combined communication modules may form a duplex communication system.

Acoustic signal transmission may for example take place at acoustic frequencies in a range between 15 kHz and 5 MHz. Relatively low frequencies may have the disadvantage that a relatively large transmitter is required. Also frequencies above 5 MHz could be considered but are generally disadvantageous in that acoustic signals in that frequency range are strongly dampened and would require comparatively high power, which is unattractive for wearable devices. By way of example an acoustic transmission frequency may be in a range of 150 to 170 kHZ.

In an embodiment the acoustic transmitter of the first module or of a combined module is configured to adapt an acoustic frequency range to optimize path loss versus delay spread. For example for short distance communication a relatively high central frequency can be selected to minimize external reflections. For a longer distance, e.g. to communicate information to a receiver outside the swimming pool, a relatively low central frequency can be selected that suffers less from dampening. In an embodiment the acoustic transmitter is further configured to take into account the composition of the water in which it is operational. For example, in seawater, having a high concentration of salt, the absorption losses in particular for higher acoustic frequencies are significant. To take into account this phenomenon, the acoustic transmitter is configured to select for a particular transmission distance in seawater an acoustic frequency that is lower than that in freshwater.

In an embodiment the acoustic transmitter of the first module or of a combined module is configured as a wideband acoustic transmitter. The transmitted signal may for example be a superharmonic signal comprising a fundamental signal component at a fundamental frequency, and a first, second and third signal components having a frequency of three times, four times and five times the fundamental frequency. In one example thereof, the wideband acoustic transmitter comprises a wideband/multifrequency acoustic transducer. In another example thereof the wideband acoustic transmitter comprises a plurality of acoustic transducers having a mutually different frequency range that are independently controllable.

In an embodiment the acoustic transmitter of the first module or of a combined module is configured to acoustically transmit an windowed sine-burst. The windowed sine-burst may for example be sine-wave at a fundamental frequency which is windowed with a windowing function, such as a root-raised cosine function. Alternatively other windowing functions, such as a Gaussian function are applicable.

In an embodiment of the underwater wearable device the acoustic transmitter is configured to selectively assume one of at least a coherent transmission mode and a non-coherent transmission mode. By way of example single-carrier QPSK communication may be applied in the coherent communication mode and Frequency-Hopping Binary Frequency Shift Keying modulation may be applied for the non-coherent transmission mode. The controller may be configured to select the transmission mode dependent on a detected type of motion (frontcrawl, breaststroke) indicated by the motion detection signal. For example propagation conditions during breaststroke allow (intermittent) underwater communications using (coherent, spectrally efficient) single-carrier communications, whereas propagation conditions during frontcrawl require more robust (i.e., less Doppler-sensitive) communications methods (e.g., non-coherent modulation). The type of motion may be detected for example with inertial sensors, but may alternatively be detected from properties of the received acoustic signal. For example the Doppler spread of the received acoustic signal is substantially larger during frontcrawl than during breaststroke.

In some embodiments the first communication module further comprises an electromagnetic transmitter configured to convert the input signal into an electro-magnetic signal and a transmission mode selector to activate one or more of the acoustic transmitter and the electromagnetic transmitter. The transmission mode selector may for example be responsive to a detected swimming mode of the swimmer. For example, in contrast to breaststroke, frontcrawl is characterized by a significant fraction of "air time". In that case, the transmission mode controller may activate both transmitters to provide a guaranteed connection with a receiving second transmission module, e.g. arranged at the side of the swimming pool. Also, it may be considered to selectively activate only the electromagnetic transmitter during air-time, if it is determined that transmission by electro-magnetic means can take place more efficient than transmission by acoustic means.

In some embodiments the first communication module further comprises one or more sensors which are communicatively coupled to the signal source, to enable acoustic transmission of sense signals. The one or more sensors may for example comprise motion sensors, a heart sensor, a temperature sensor and the like.

In an embodiment of the communication system referred to above, the first communication module further comprises: an acoustic receiver configured to receive an external acoustic signal and to convert the received external acoustic signal into a processable signal;
a signal processor configured to process the processable signal; wherein the second communication module further comprises:
a signal source configured to provide an input signal to be transmitted;
a transmitter configured to convert the input signal into an acoustic transmission signal suitable for transmission in water and to transmit the same. A swimmer or diver may wear more than two underwater wearable devices that are capable to acoustically communicate to each other. Other configurations are possible wherein a swimmer wears two or more underwater wearable devices and a trainer in the swimming pool wears another underwater wearable device for example to receive information from the devices worn by the swimmer. Additionally, one or more further communication modules may be provided in a housing configured to be positioned or mounted at a predetermined location for example arranged in a swimming pool.

In an embodiment, the underwater wearable device with the first communication module and the underwater wearable device with the second communication module are configured to be worn at mutually axially distant locations of the human body (e.g. near a feet and the head), and wherein at least the signal processor of the second communication module is configured to determine a delay with which an acoustic signal is received from the first communication module. When the distance between the devices is known, a velocity of the swimmer can be computed from the length of the delay. In an version of that embodiment, the second communication module is configured to transmit an acoustic signal with an indication of the determined delay to the first communication module, and the signal processor of the first communication module is configured to determine a further delay with which the acoustic signal from the second communication module is received, the signal processor of the first communication module being configured to estimate a relative velocity of the swimmer relative to the water from the difference between the delay indicated by the acoustic signal and the further delay. Based on the determined delay values also a distance may be computed in case this is not yet known.

In another embodiment the underwater wearable device with the first communication module and the underwater wearable device with the second communication module are configured to be worn at mutually distant locations of the human body (e.g. near at the left wrist and the right wrist respectively) and the second communication module is configured to split the processable signal into a first signal component and a second signal component, wherein the first signal component is associated with a component of the transmitted acoustic signal that is directly transmitted to the second communication module and wherein the second signal component is associated with a component of the transmitted acoustic signal that is transmitted to the second communication module via a reflection, wherein the signal processor is configured to determine a difference in a time of arrival of the first signal component and the second signal component and to estimate a depth of the swimmer from that difference. Based on this principle, using more acoustic signal transmitters or by delay time measuring at mutually different phases of a swimming stroke, more detailed information about the environment of the swimmer or diver can be obtained.

In addition a communication method is provided wherein in a first underwater wearable device worn by a swimmer in water an input signal is provided that is to be transmitted. In the first device worn by the swimmer the input signal is converted into an acoustic transmission signal that is acoustically transmitted through the water. Remote from the location of the device, a transmitted version of the acoustic signal is received by a second underwater wearable device worn by the swimmer and the received transmitted version is converted into a processable signal and processed. Due to the fact that transmission takes place by an acoustic signal it is not only possible to more effectively transmitting data with the signal, but due to the behavior of the acoustic signal in water useful information can be derived from the properties of the transmitted version of the acoustic signal such as a velocity of the swimmer, a depth of the swimmer and the like.

BRIEF DESCRIPTION OF THE DRAWINGS

These and other aspects are described in more detail with reference to the drawings, therein:

FIGS. 8D and 8E show a respective spectrogram of a received acoustic signal while the swimmer was at rest and while swimming breast stroke respectively;

DETAILED DESCRIPTION OF EMBODIMENTS

Figure 1:
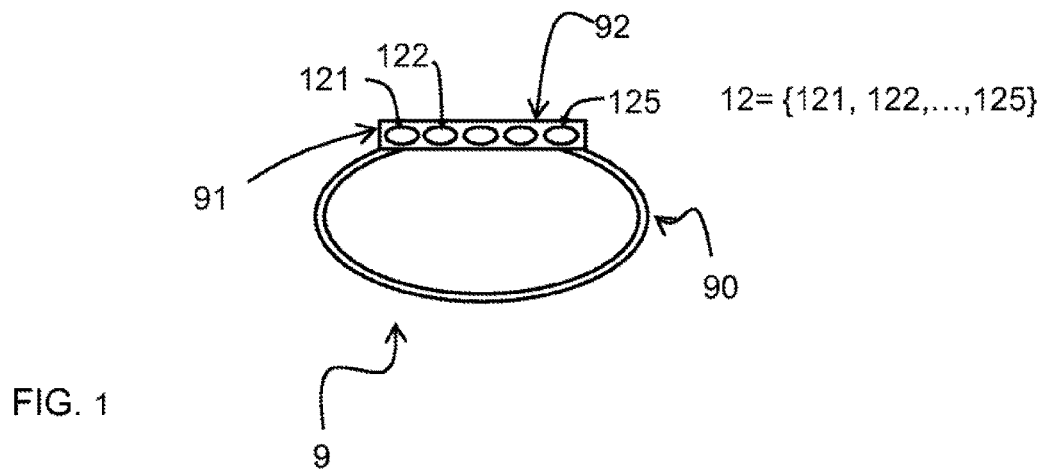
FIG. 1 schematically shows an exemplary underwater wearable device.

FIG. 1 schematically shows an exemplary underwater wearable device 9. The exemplary device is provided with a brace 90 with which a swimmer can wear the device 9 around the wrist or the ankle for example. The brace 90 is attached to a waterproof housing 91 which may have a display 92, for example a touch sensitive display with which the swimmer can control an operation. As further schematically shown in FIG. 2A, the housing 91 is provided with a first communication module 10 that comprises a signal source 11 configured to provide an input signal $S_{11}$ to be transmitted and further an acoustic transmitter 12 configured to convert the input signal $S_{11}$ into an acoustic transmission signal $A_{T10}$ to be transmitted through water. As shown in FIG. 1, the acoustic transmitter 12 may have a plurality of transmitter elements 121, 122, . . . , 125 distributed on the surface of the housing 91 for a large spatial transmission angle.

Figure 2A:
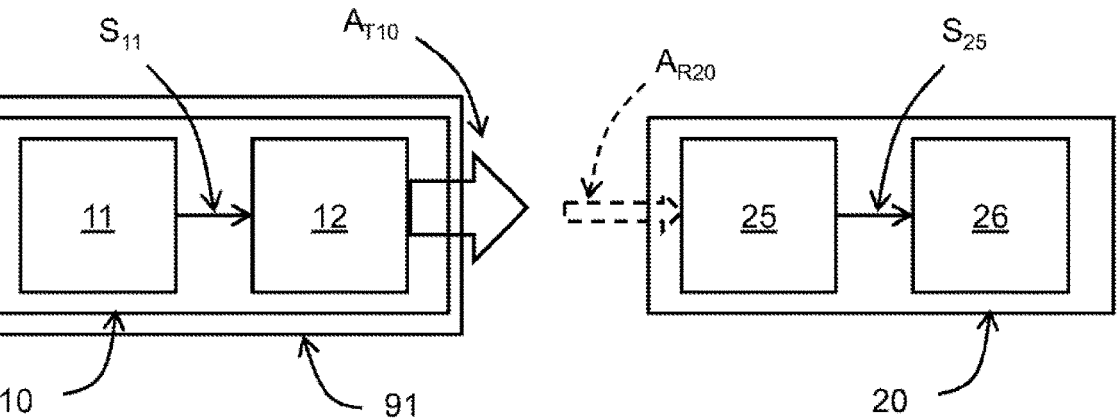
FIG. 2A, 2B shows examples of a communication system with a first and a second communication module.

In the example shown in FIG. 2A, the first communication module 10 of the underwater wearable device 9 cooperates with a second communication module 20 as part of a communication system 1. The second communication module 20 includes an acoustic receiver 25 configured to receive an external acoustic signal $A_{R20}$, here being a modified version of the transmitted acoustic transmission signal $A_{T10}$, and to convert the received external acoustic signal into a processable signal $S_{25}$. The second communication module 20 also includes a signal processor 26 that is configured to process the processable signal $S_{25}$. It is noted that a signal processor such as signal processor 16, 26 may be provided in various embodiments. In one embodiment the signal processor is a general purpose processor, which performs its computational tasks according to a program stored in a memory, for example a rewritable memory. The latter embodiment has the advantage that the product can be upgraded with new features. Alternatively the signal processor may be provided as dedicated hardware. Typically this has the advantage of a lower power consumption and a higher processing speed as compared to that of a programmable processor. As a still further alternative signal processing may be implemented by optical components. Still further, various components, programmable, non-programmable, electronic and optical may be combined for optimizing functionality, computation speed and power consumption.

In the example shown in FIG. 2A, not claimed herein, the second communication module 20 is arranged at a fixed position, e.g. at the side of a swimming pool. In other examples a second communication module may be accommodated in another underwater wearable device. It will be clear that typically also a power supply utility will be present in the communication modules, E.g. in the form of a battery, which may be replaceable or rechargeable, for example by an external power source or by an internal power source, e.g. a solar cell provided on the housing or a motion to electric energy conversion device. For a communication module arranged at a fixed position also a mains connection may be contemplated.

Figure 2B:
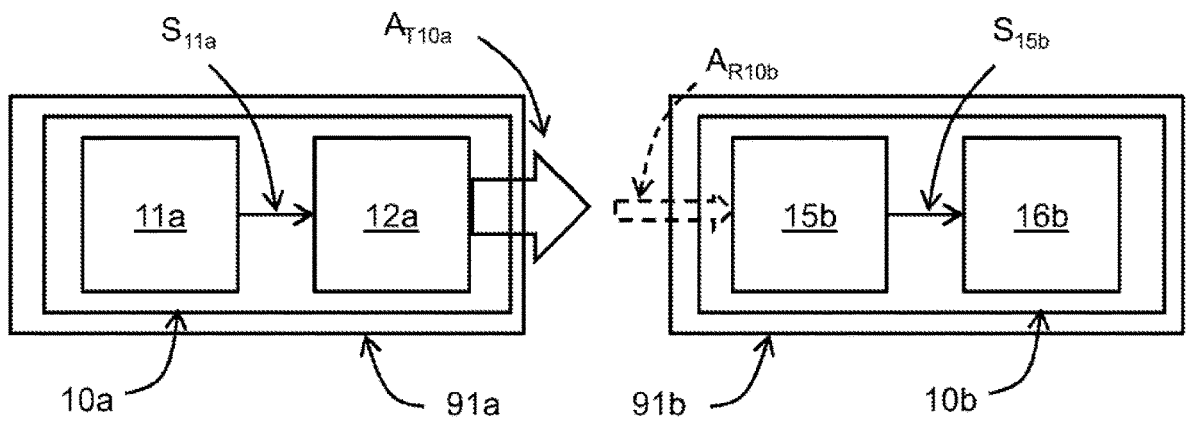

As shown in FIG. 2B, a first and a second acoustic communication module 10a, 10b, are both accommodated in a housing 91a, 91b of an underwater wearable device. Parts of the acoustic communication module 10a in the housing 91a corresponding to those of the module 10 in FIG. 2A have an additional suffix a. Parts of the acoustic communication module 10b in the housing 91b corresponding to those of the module 20 in FIG. 2A have a reference wherein the first digit "2" is replaced with a "1", and have an additional suffix b.

Figure 3:
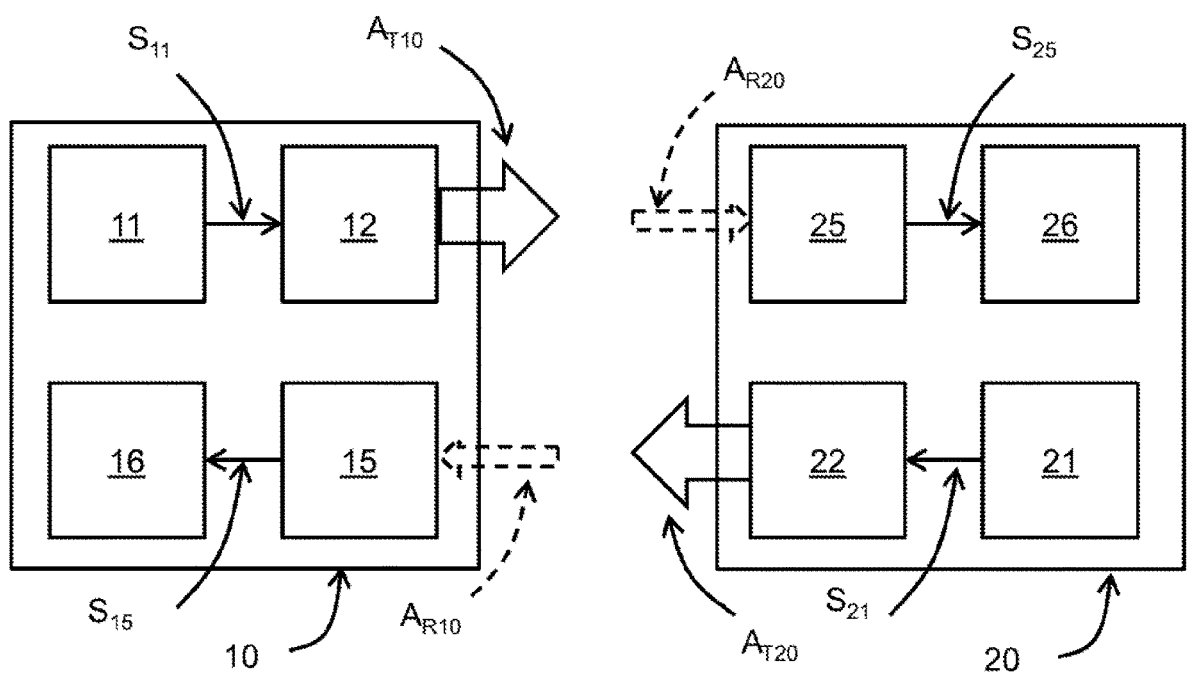
FIG. 3 shows a further examples of a communication system with a first and a second communication module.

As schematically shown in FIG. 3 the communication modules may be configured for full-duplex communication. To that end the first communication module 10 further includes an acoustic receiver 15 configured to receive an external acoustic signal $A_{R10}$ and to convert the received external acoustic signal into a processable signal $S_{15}$. The first communication module 10 also includes a signal processor 16 configured to process the processable signal $S_{15}$, $S_{15a}$. Conversely, the second communication module 20 further includes a signal source 21 configured to provide an input signal $S_{21}$ to be transmitted and acoustic transmitter 22 configured to convert the input signal $S_{21}$ into an acoustic transmission signal $A_{T20}$ to be transmitted in the water.

Figure 4:
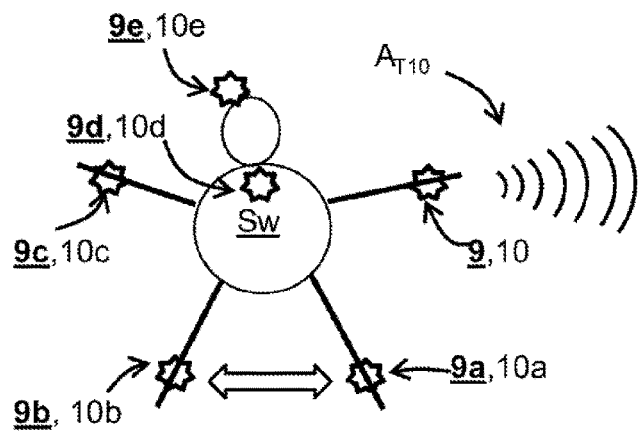
FIG. 4 shows an exemplary communication system with five underwater wearable devices.

As noted above, the second acoustic communication module is accommodated in another underwater wearable device. In fact an acoustic communication system may be provided with a plurality of acoustic communication modules, each being provided as part of an underwater wearable device and each being capable of duplex communication with each of the other communication modules. An example thereof is shown in FIG. 4. Therein the swimmer Sw wears various underwater wearable devices 9, 9a, ..., 9e, each with a respective acoustic communication module 10, 10a, ..., 10e. A first swimmer wearable device 9 with a first acoustic communication module 10 is provided at the right wrist. A second underwater wearable device 9a with a second acoustic communication module 10a is provided at the right ankle. A third underwater wearable device 9b with a third acoustic communication module 10b is provided at the left ankle. A fourth underwater wearable device 9c with a fourth acoustic communication module 10c is provided at the left wrist. A fifth underwater wearable device 9d with a fifth acoustic communication module 10d is provided at the chest. Furthermore it may be contemplated to provide a sixth underwater wearable device 9e with a sixth acoustic communication module 10e around the head, for example, provided in a hear ribbon. In practice, however, such a head-mounted device is less useful for swimmers as it would me mostly above water level. It may however have an additional value for divers. In this connection it is noted that a diver is a specific instance of a swimmer. For clarity, the details of the underwater wearable devices 9, 9a, ... 9e are not shown in detail in FIG. 4. Only the location of the acoustic communication modules 10, 10a, 10b, 10c, 10d, 10e is indicated therein. The acoustic communication modules may communicate with each of the others. For example acoustic communication modules 10a, 10b may communicate with each other as shown in more detail in FIG. 5. The communication modules in the underwater wearable devices may further be configured to communicate with a communication module arranged at a fixed position. For example one of the first communication modules, e.g. the first communication module 10 may be dedicated for communication at a larger distance, and other communication modules 10a, 10b, 10c, 10d, 10e worn by the swimmer Sw may communicate with the remote communication module via the first communication module 10.

Underwater wearable devices 9, 9a, ..., 9e equipped with the communication modules 10, 10a, ..., 10e may have additional functionalities, dependent on their location on the human body. For example underwater wearable devices 9 and/or 9c may be provided as a smartwatch, which in addition to the communication module 10, 10c further comprises a touch screen a clock and programmable processing facilities for various user applications. As another example, underwater wearable device 9d, provided with a chest band may include in addition to the communication module 10d a heart monitor.

Figure 5:
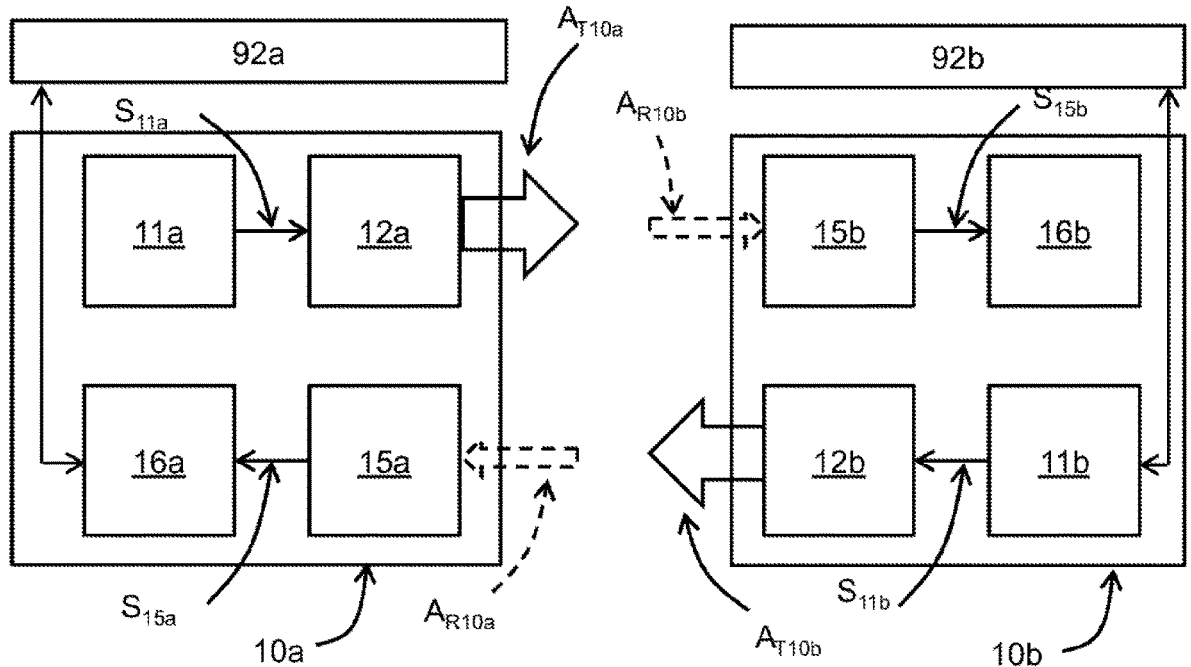
FIG. 5 shows two communication modules therein in more detail.

By way of example, the pair of acoustic communication modules 10a, 10b is shown in more detail in FIG. 5. Parts of the acoustic communication modules 10a, 10b therein corresponding to those in FIG. 3 are provided with the suffix 'a', and 'b' respectively. Whereas the acoustic transmitter 12, 12a, 12b is schematically indicated as a single block the acoustic transmitter may in practice (schematically shown in FIG. 1) comprise a plurality of acoustic transmission elements arranged at mutually different positions on an outer surface of the underwater wearable device to improve the spatial distribution of the acoustic transmission signal. In the example shown, the acoustic communication modules 10a, 10b are communicatively coupled with a proper touch screen display 92a, 92b that is incorporated in the underwater wearable device.

Figure 6:
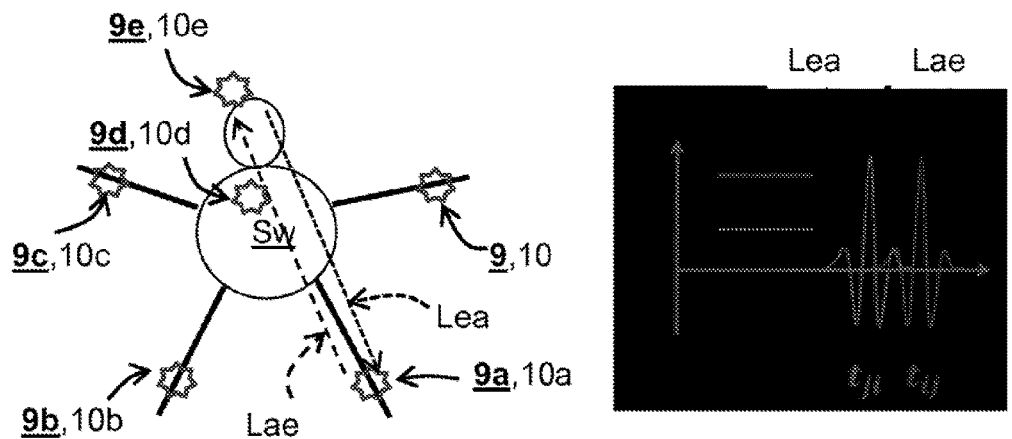
FIG. 6 shows an application of a communication system with a pair of underwater wearable devices to estimate a velocity of the swimmer.
Figure 6A:
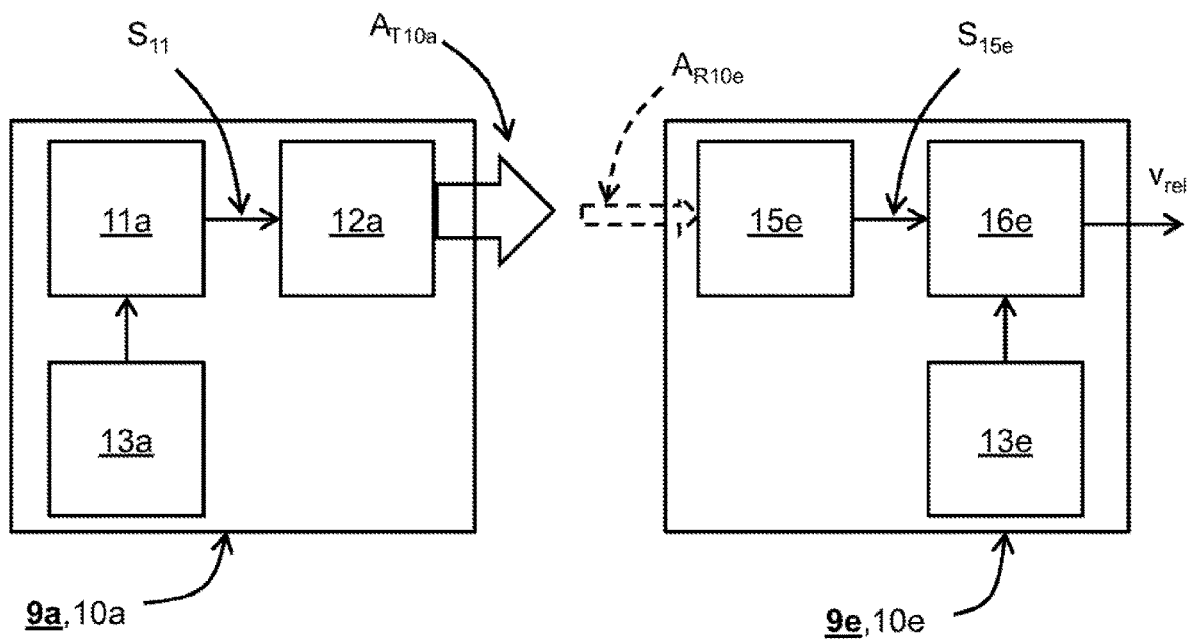
FIG. 6A shows details of the communication modules used therein.

FIG. 6 shows an example, wherein an acoustic communication between a pair of acoustic communication modules 10a, 10e worn as part of a underwater wearable device 9, 9a, ..., 9e by the swimmer Sw are used to estimate a velocity with which the swimmer moves through the water. To that end the communication modules involved therein are worn at mutually axially distant locations of the human body. In this case communication modules 10a is attached as part of a underwater wearable device 9a to an ankle and the other communication module 10d is attached to the breast of the swimmer as part of another underwater wearable device 9d. An embodiment of the communication modules 10a, 10d is shown in FIG. 6A.

Parts of the acoustic communication modules 10a, 10d therein corresponding to those in FIG. 3 are provided with the suffix 'a', and '11' respectively. The acoustic communication modules 10a, 10d further include a clock unit 13a, 13d respectively.

In the embodiment shown, the signal processor 16d of the communication module 10d is configured to determine a delay $L_{ad}$ with which an acoustic signal is received from the communication module 10a. The signal processor 16d can therewith estimate a relative velocity $V_{rel}$ of the swimmer Sw relative to the water using equation (1):

$$V_{rel} = V_{ac} - \frac{D_{ad}}{L_{ad}} \qquad (1)$$

Therein $V_{ac}$ is the velocity of sound in water ($V_{ac} \approx 1500$ m/s) and Dad is the distance between the communication modules 10a, 10d.

The delay may for example be determined in that the communication module 10a transmits its acoustic signal $A_{T10a}$ with a time-stamp t1 provided by its clock unit 13a, and that the communication module 10*d* determines the difference with a time of arrival determined by clock unit 13*d*. Alternatively it may be contemplated that communication module 10*a* transmits the acoustic signal $A_{T10a}$ at predetermined points in time, known to the communication module 10*d*, and that the latter determines the delay with which it receives the acoustic signal with respect to these predetermined points in time. In that case, it is not necessary to transmit a time stamp.

In another embodiment, the communication modules 10*a*, 10*d* are both configured with transmission and receiving utilities, as shown in FIG. 5 for the communication modules 10*a*, 10*b*. Therewith a more accurate estimation of the relative velocity is possible using the following computation (equation 2).

$$V_{rel} = \frac{D_{ae}}{2}\left(\frac{1}{L_{da}} - \frac{1}{L_{ad}}\right) \quad (2)$$

Therein communication module 10*d* computes the delay $L_{ad}$ with which it receives the acoustic signal from communication module 10*a* in the same way as described above, and likewise communication module 10*a* computes the delay $L_{da}$ with which it receives the acoustic signal from communication module 10*d*. One of the communication modules then transmits a message indicative for the measured delay to the other one, and the other one estimates the relative velocity $V_{rel}$ from the both delay values $L_{ad}$, $L_{da}$ with equation (2).

As an example the distance Dad between the communication modules 10*a*, 10*d* may be 1.7 m. Therewith the measured delay would be 1.1333 ms in both directions if the swimmer Sw is at rest. When the swimmer moves forward with a speed of 1 m/s the delay $L_{ad}$ is increased to 1.1341 ms and the delay $L_{da}$ us decreased to 1.1325 ms.

It is an advantage of this other embodiment that the equation (2) used to estimate the relative velocity $V_{rel}$ is independent of the velocity $V_{ac}$ of sound in water. It may further be contemplated to estimate the velocity $V_{ac}$ from the delay values $L_{ae}$, $L_{ea}$ with the following equation (2a).

$$V_{ac} = \frac{D_{ad}}{2}\left(\frac{1}{L_{da}} + \frac{1}{L_{ad}}\right) \quad (2a)$$

Furthermore, the water temperature $T_W$ can be estimated from the value estimated for $V_{ac}$ as a substantially linear relationship may be presumed in normal conditions. For example in fresh water the speed of sound increases substantially linearly from 1403 m/s to 1481 m/s in the temperature interval from 0 to 20° C. In the same temperature interval the speed of sound increases substantially linearly from 1449 m/s to 1522 m/s in seawater.

Alternatively a dedicated sensor, e.g. thermistor based, may be used for temperature measurements.

Figure 7:
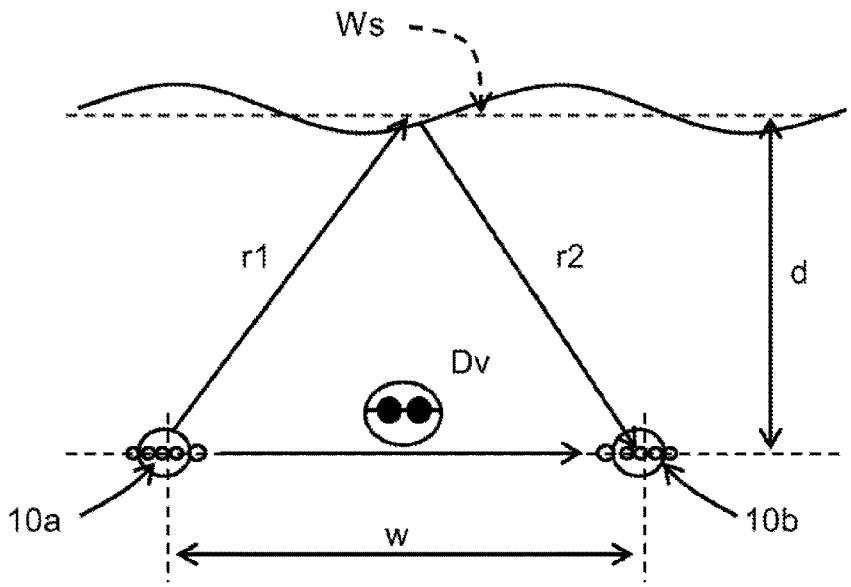
FIGS. 7, 7A and 7B shows an application of a communication system with a pair of underwater wearable devices to estimate a depth d of a swimmer.
Figure 7A:
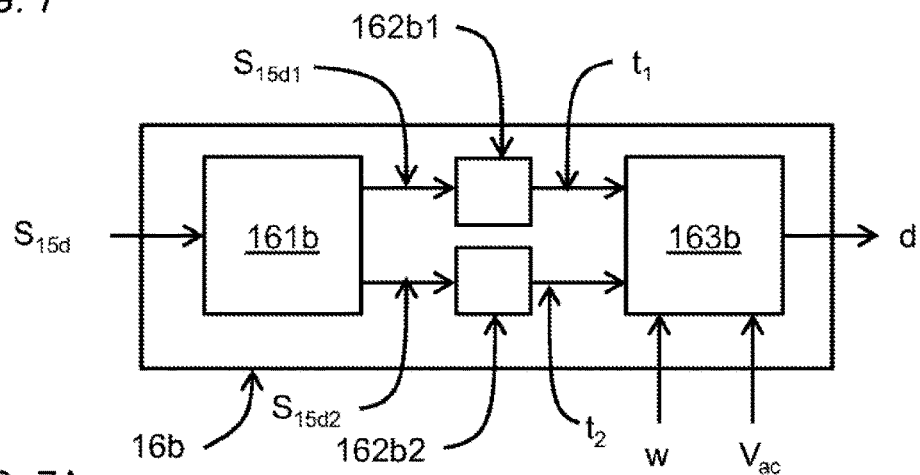

FIGS. 7 and 7A illustrate a second application of a pair of underwater wearable communication modules 10*a*, 10*b* wherein a depth d of a diver Dv with respect to the water surface Ws is estimated on the basis of a measured time of arrival between a directly transmitted acoustic wave and an acoustic wave received indirectly via refection at the water surface.

As shown schematically in FIG. 7, the diver Dv wears a first and a second acoustic communication module 10*a*, 10*b*, at the right and the left wrist respectively. The acoustic communication modules 10*a*, 10*b* are accommodated in a respective underwater wearable device, for example the underwater wearable device 9 shown FIG. 1. The communication modules 10*a*, 10*b* may be provided as shown in FIG. 2B or as in FIG. 5 for example.

As shown in FIG. 7, the pathlength for the directly transmitted acoustic wave is the distance w between the acoustic communication modules 10*a*, 10*b*. The path length for the reflected component is equal to:

$$r1 + r2 = 2\sqrt{\left(\frac{w}{2}\right)^2 + d^2} \quad (3)$$

The difference ($\Delta t$) in time of arrival is related to the depth as follows.

$$\Delta t = \frac{2\sqrt{\left(\frac{w}{2}\right)^2 + d^2} - w}{V_{ac}} \quad (4)$$

Accordingly, the depth can be estimated with equation (5)

$$d = \sqrt{\left(\frac{\Delta t \cdot V_{ac}}{2}\right)^2 + \Delta t \cdot V_{ac} \cdot w} \quad (5)$$

By way of example, the diver Dv may be at a depth of 50 cm below the surface of the water W, and the distance w at the time of measurement is 1 m.

In that case the path length of the reflected wave is 1.41 m. Hence the difference in path length (0.41 m) corresponds to corresponds to difference of arrival time of 0.273 ms.

It is noted that the distance w will not be constant, but is a function of time. To take this variation into account, the current distance w may for example be determined by a separate estimation, for example by determining a delay with which the acoustic wave is directly received. As the movement of the diver is typically of a periodical nature, the difference of arrival time measurement may for example be scheduled at the point in time where the distance has a predetermined value. The width w may be approximated by a constant value in the short time interval (e.g. less than a ms) required for a measurement.

FIG. 7A schematically shows an exemplary embodiment of the signal processor 16*b* for this purpose. In a first process module 161*b*, signal components $S_{15d1}$, and $S_{15d2}$ are extracted from the processable signal $S_{15d}$. This may for example be achieved in that the acoustic signal transmitted by the first acoustic communication module 10*a* has a time-dependent pattern, for example as a frequency sweep from a first to a second acoustic frequency. Alternatively, the signal may be modulated with a time dependent signal. Therewith the first process module 161*b* can separate the components. Delay time evaluation modules 162*a*1 and 162*a*2 may then determine the delays t1, t2 with which the signal components $S_{15d1}$, and $S_{15d2}$ corresponding to the directly transmitted wave and the acoustic transmitted wave are received, and the computation module 163*d* may then estimate the depth d on the basis of the expression above. As the extracted signal component $S_{15d1}$, is less disturbed by reflections than the original processable signal $S_{15d}$ it is very suitable for further processing wherein information from the signal is extracted. Such information is for example a timestamp or measurement data from a sensor conveyed by the acoustic signal.

It is noted that alternatively an autocorrelation function may be evaluated for the processable signal $S_{15d}$, wherein the first peak in the autocorrelation function occurs at the position corresponding to the difference of arrival time t2-t1. In the example shown in FIG. 7A, the distance w and the velocity V of sound in water are provided as external data to the computation module 163d. Alternatively, the computation module 163d may estimate the distance w from the measured delay t1, using equation 1 or otherwise.

Figure 7B:
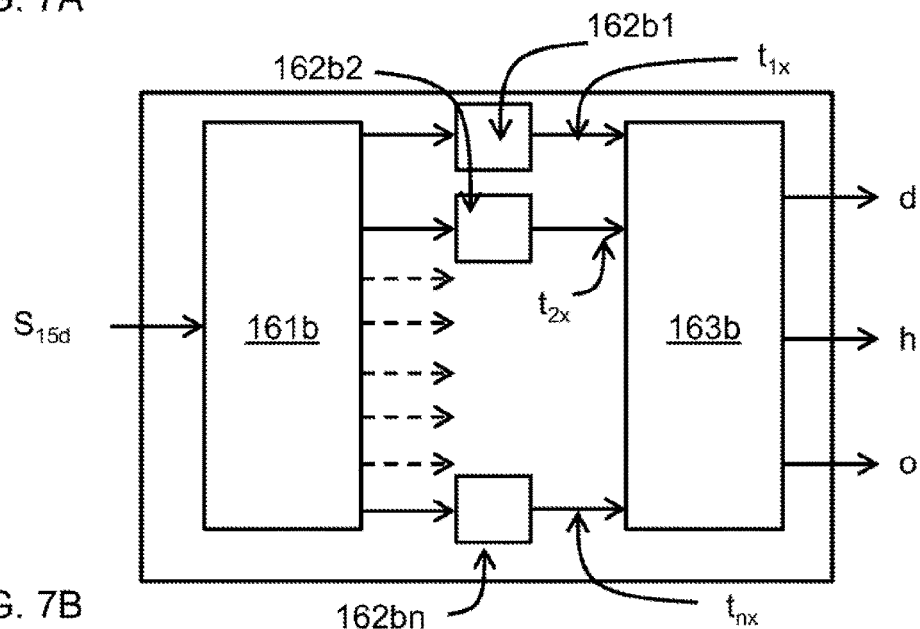

Whereas the strongest reflection of the acoustic signal will typically occur at the surface Ws of the water, the received acoustic signal may also include reflections at other surfaces, e.g. a wall of a swimming pool, a bottom of a swimming pool or of the sea, an object in the neighborhood etc. By including further communication modules, at mutually different positions of the human body it is possible to distinguish such reflections and therewith use a set of underwater wearable communication modules as a sonar. This is schematically illustrated in FIG. 7B. In this embodiment a plurality of communication modules in the set is configured to transmit an acoustic signal. The first process module 161b in this case separates the processable signal $S_{15d}$ into components attributed to each of the transmitting modules and delay time evaluation modules 162b1, 162b2, . . . , 162bn identify for each of the components a respective set of delay time differences $t_{1x}, t_{2x}, \ldots, t_{2n}$. The first set of delay time differences $t_{1x}$, indicates the delays with which the various reflections of an acoustic wave from the first transmitting module is received. The second set of delay time differences t2), indicates the delays with which the various reflections of an acoustic wave from the second transmitting module is received. Each delay time difference is indicative for a distance to the point of reflection, and that distance can be determined with equation (5). With this information from the delay time evaluation modules 162b1, 162b2, . . . , 162bn the computation module 163d can construct a course 3D image of the reflecting entities.

It may alternatively be possible to use measurement data obtained with a single transmitting module at mutually different phases of a swimming stroke of the swimmer Sw. In the mutually different phases the single transmitting module assumes mutually different positions with respect to surrounding reflecting surfaces. Therewith the measurement data obtained with the single transmitting module at the mutually different positions corresponding to the phases of the swimming stroke are substantially equivalent to measurement data obtained with a plurality of transmitting modules arranged at those positions at a particular point in time, provided that the reflecting surfaces can be approximated as static during the measurement.

Figure 8:
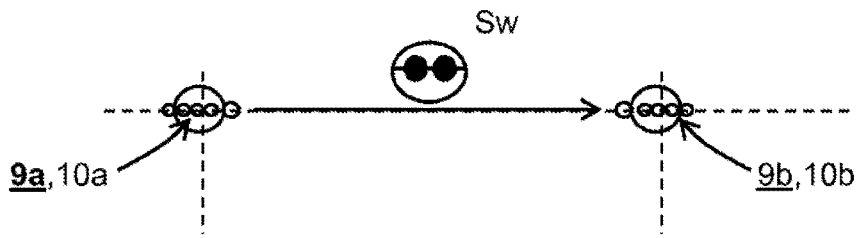
FIG. 8, 8A-8E illustrate an application of a communication system with a pair of underwater wearable devices as well as a device accommodated at a fixed position inside the swimming pool, to determine properties of a swimming stroke used by the swimmer; Therein
Figure 8A:
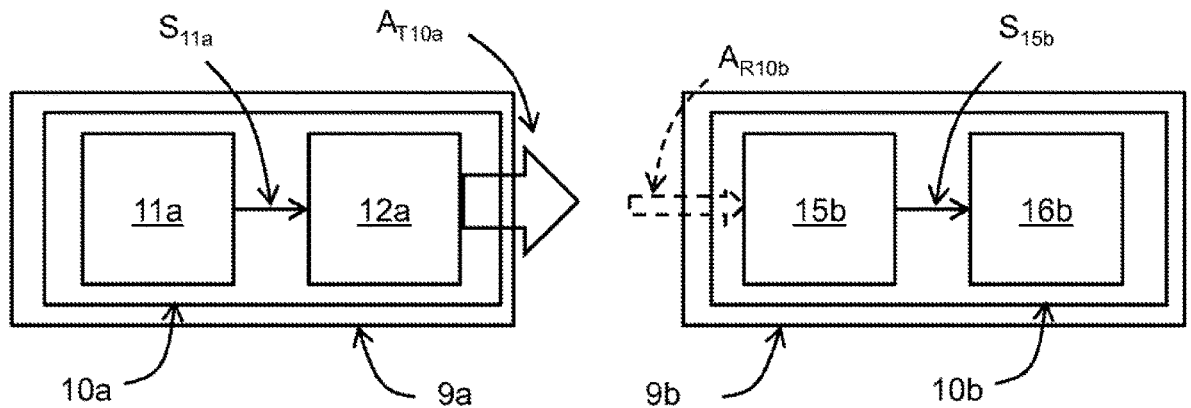
Figure 8B:
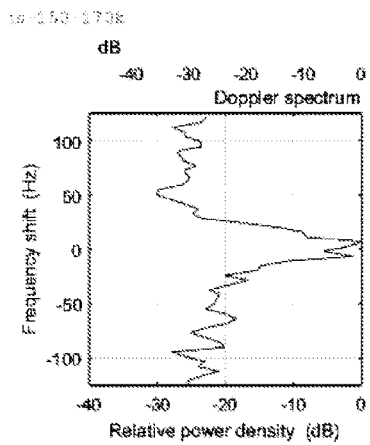
Figure 8C:
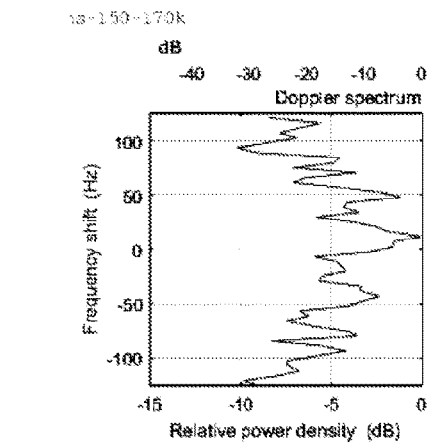

FIGS. 8 and 8A illustrate a further embodiment of a communication system comprising a first and a second communication module 10a, 10b worn as part of a respective swimmer wearable device 9a, 9b by a swimmer Sw. Therein FIG. 8 is an overview and FIG. 8A shows the communication modules 10a, 10b in more detail. The first communication module 10a is incorporated in a first underwater wearable device 9a worn at the right wrist of a swimmer Sw. The second communication module 10b is worn at the left wrist of a swimmer Sw. The signal processor 16b of the second communication module 10b is configured to determine a Doppler spread in the signal $A_{R10b}$ received from the first communication module 10a. The signal processor 16b is further configured to determine a type of stroke used by the swimmer Sw from the determined Doppler spread. By way example FIGS. 8B and 8C respectively show the Doppler spectrum for a swimmer using the breaststroke and using the frontcrawl respectively. It can be seen in FIG. 8B that the Doppler spectrum in case of the swimmer using the breaststroke is relatively narrow. I.e. the width defined for −10 dB is about 40 Hz. As shown in FIG. 8C, when the swimmer uses frontcrawl, the Doppler spectrum is substantially broader, having a width for −10 dB of about 250 Hz.

Figure 8D:
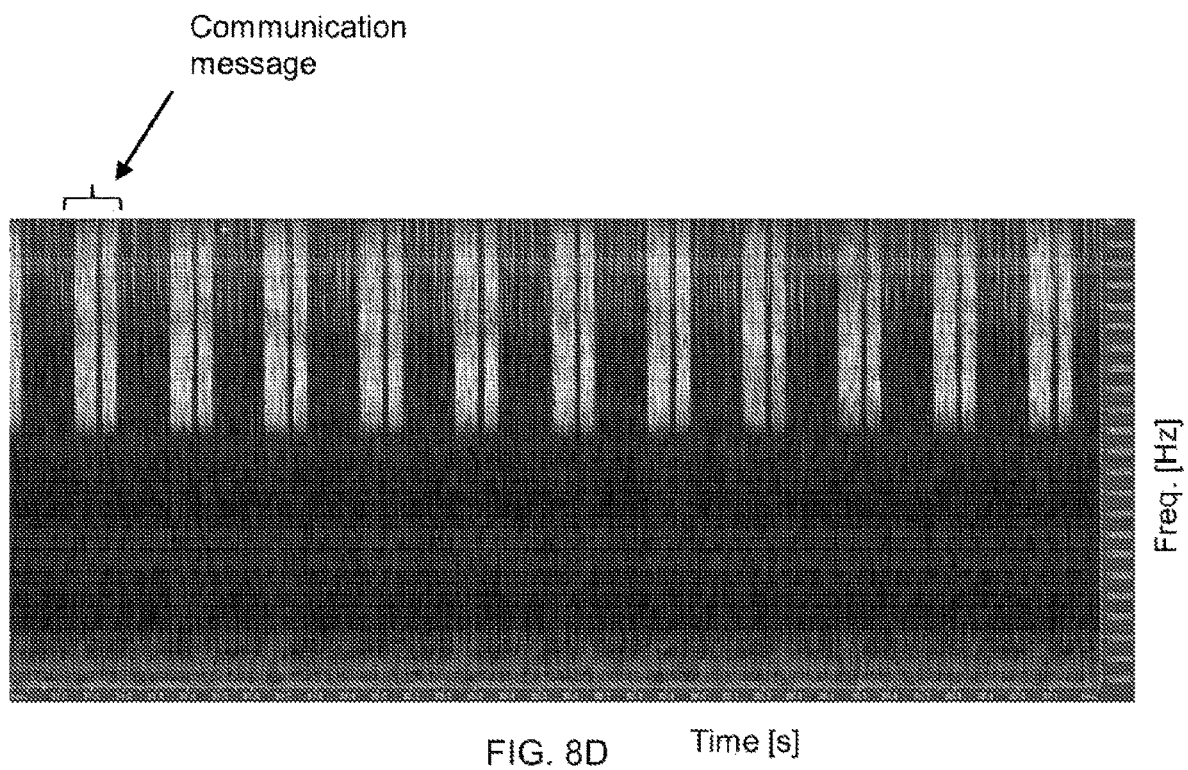
Figure 8E:
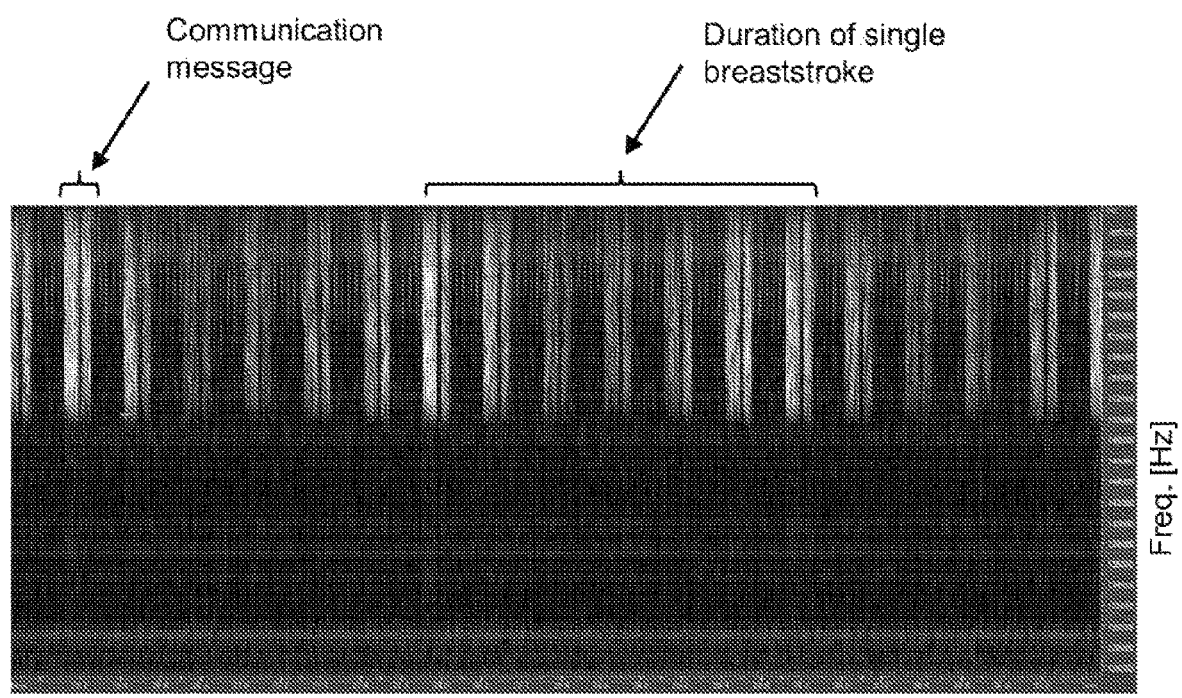

With reference to FIG. 8D and FIG. 8E another approach is illustrated. FIG. 8D shows the spectrogram of the received acoustic signal $A_{R10b}$ that was obtained while the swimmer remained statically under water. FIG. 8E shows the spectrogram of the received acoustic signal obtained while the swimmer was swimming breast stroke. In FIGS. 8D and 8E, each communication message is visible as a combination of two vertical blocks. FIG. 8E shows that in this example seven communication messages were transmitted during a single cycle of breaststroke swimming. From a comparison of these spectrograms it becomes apparent that the nature of the intensity variations and the repetition period of these variations are indicative for the type of swimming stroke and the repetition period of the swimming stroke used.

Figure 9A:
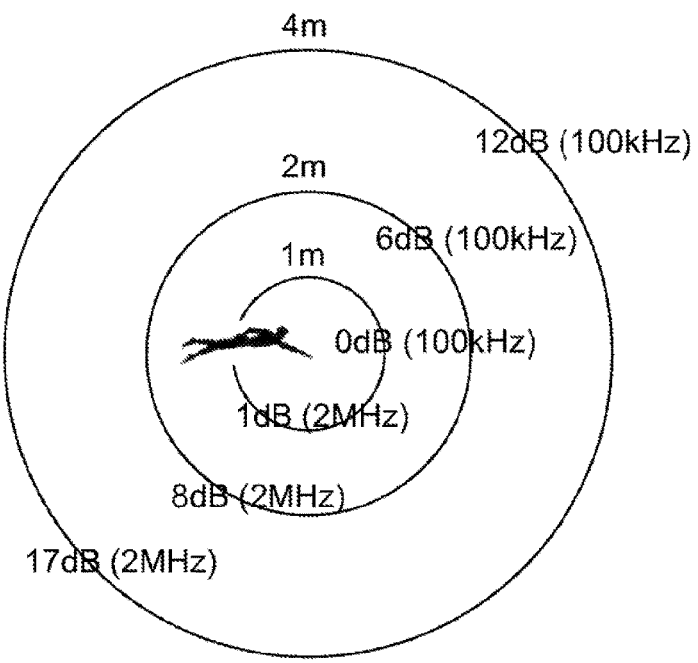
FIG. 9A schematically illustrates the dampening of an acoustic signal.

As schematically shown in FIG. 9A, the dampening of an acoustic signal is strongly dependent on a main frequency f(Hz) of the acoustic signal. An indication for the dampening is:

$$TL_{dB}(l,f) = 20 \cdot \log_{10} + l \cdot f^2 \cdot 3 \cdot 10^{-7} \tag{6}$$

Wherein l is the distance from the source in m.
By way of example an acoustic signal with a relatively low frequency of 100 kHz has relatively modest dampening of 12 dB at a distance l=4 m from the source, whereas a signal with a relatively high frequency of 2 MHz has a relatively high dampening of 17 dB.

Figure 9B:
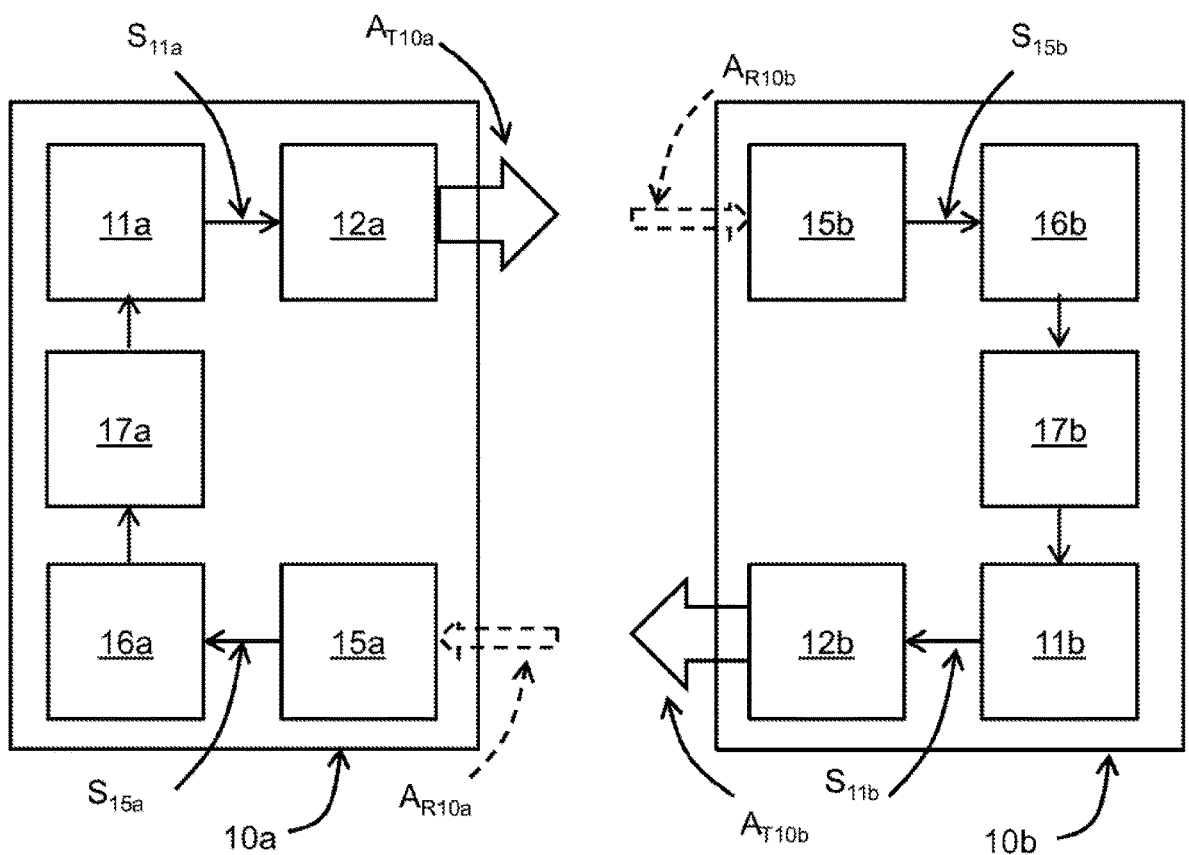
FIG. 9B shows a communication system with a pair of communication modules that adapt the acoustic frequency in accordance with an estimation of the distance.

In an embodiment shown in FIG. 9B distance estimation means are provided in the signal processors 16a, 16b for estimating a mutual distance between the communication modules 10a, 10b. The distance estimation means may for example estimate the mutual distance from a delay with which an acoustic signal is received. The communication modules 10a, 10b are further provided with a frequency controller 17a, 17b with which a transmission frequency is controlled in accordance with the estimated distance. A relatively high frequency may for example be selected if the estimated distance is small and a relatively low frequency may be selected if the distance is large. This may also applied if communication takes place with a communication module arranged at a fixed position, e.g. at the side of the swimming pool, in which case the distance is typically larger than a distance between two communication modules worn by the same swimmer Sw.

Figure 10:
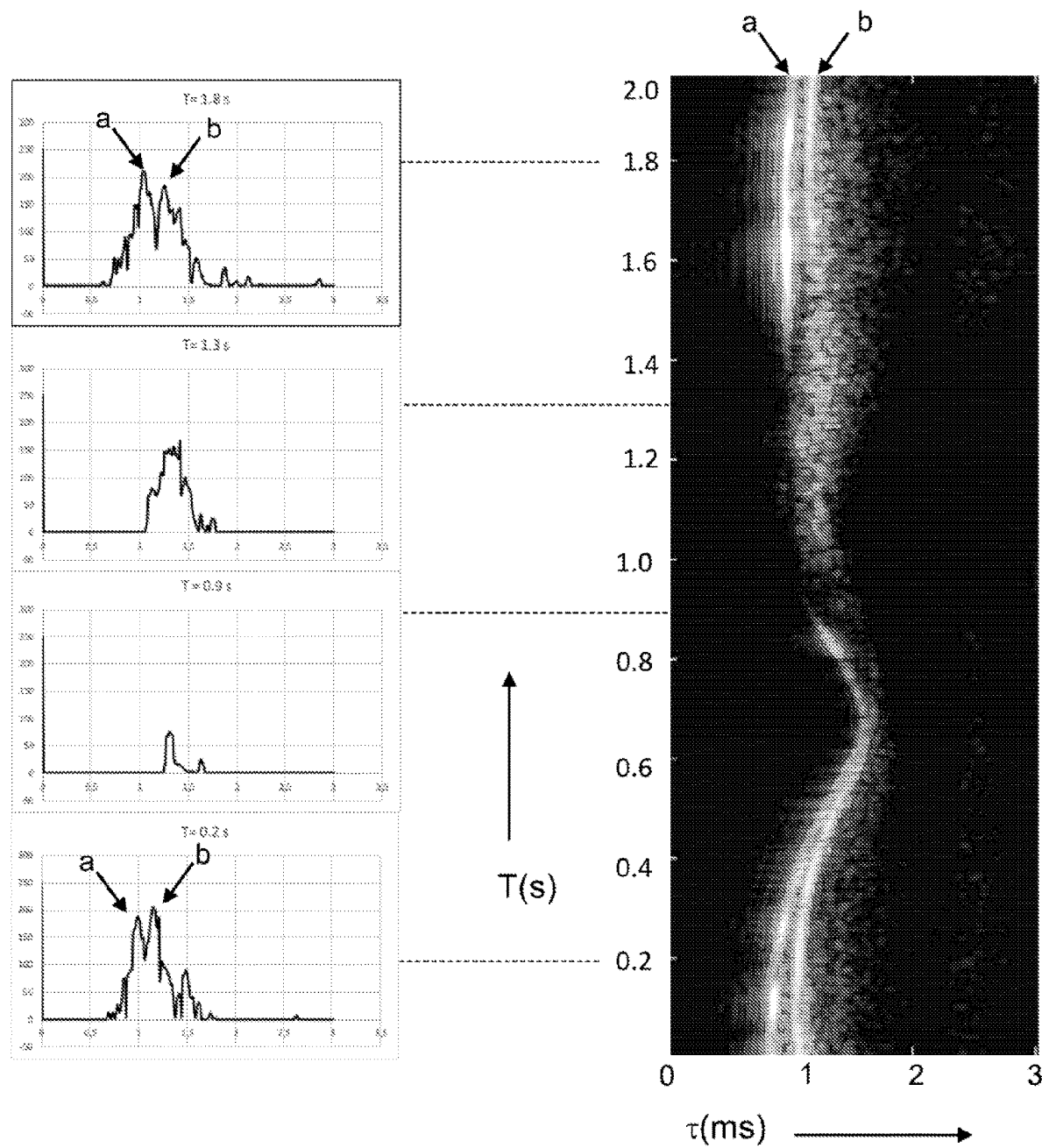
FIG. 10 shows the acoustic impulse response evolution obtained of an acoustic signal transmitted between devices attached to the wrists of a swimmer while swimming breast stroke.

The transmission of an acoustic signal can be characterized by its impulse response h(τ), i.e. the value h of the response at a point in time, delay τ, relative to a reference time, i.e. the time of transmission. During a swimming stroke the impulse response function is itself a time-dependent function due to the time dependency of the relative position of the transmitter and the receiver. This time-dependent function is denoted the acoustic impulse response evolution h(t,τ), wherein t is an indication for the point in time at which the acoustic impulse response was measured. For example t is the time of transmission of the acoustic signal for which the impulse response is measured. FIG. 10 the right hand side illustrates the acoustic impulse response evolution h(T,τ) which was measured during 2 seconds of swimming breast stroke. Therein the vertical axis indicates the time T of transmission, the horizontal axis indicates the delay time T and the brightness is indicative for the logarithmic value of the measured response amplitude, i.e. for the value:

$$20 \log_{10}(|\hat{h}(T,\tau)|)$$

The left side of FIG. 10 shows in vertical direction representative impulse responses for T=0.2 s, T=0.9 s, T=1.3 s and T=1.8 s respectively. The motion of the wrists in the vertical direction can be determined based on an analysis of this impulse response evolution. E.g., for depth estimation of the swimmer or diver. As can be seen in FIG. 10 for example, the impulse response shows clearly distinguishable peaks during certain phases of the swimming cycle. For example, as specifically shown for points in time T=0.2 s, and T=1.8 s, the impulse response has a first peak (a) which is due to a direct transmission of the acoustic signal and a second peak (b), which is delayed with respect thereto with about 25 ms. This second peak results from a reflection of the acoustic signal against the water surface. This implies that the difference in pathlength for the direct transmission and for the transmission by reflection is about 0.38 m. As illustrated by this example, the motion of the wrists in the vertical direction can be determined based on an analysis of this impulse response evolution. Therewith also a depth of the swimmer or diver can be estimated.

The invention claimed is:

1. A communication system comprising:
a first underwater wearable device provided with a first communication module that comprises:
  a signal source configured to provide an input signal to be transmitted; and
  an acoustic transmitter configured to convert the input signal into an acoustic signal suitable for transmission in water and to transmit the acoustic signal; and
a second underwater wearable device provided with a second communication module that comprises:
  an acoustic receiver configured to receive a transmitted version of the acoustic signal and to convert the received transmitted version of the acoustic signal into a processable signal; and
  a signal processor configured to process the processable signal;
wherein the first underwater wearable device with the first communication module and the second underwater wearable device with the second communication module are configured to be worn at mutually distant locations of a swimmer,
wherein the communication system is configured to derive information pertaining to the swimmer from properties of the received transmitted version of the acoustic signal, and
wherein the properties are due to behavior of the acoustic signal in water,
wherein the mutually distant locations at which the underwater wearable device with the first communication module and the underwater wearable device with the second communication module are configured to be worn by the swimmer are axially different,
wherein the signal processor of the second communication module is configured to determine a delay with which the received transmitted version of the acoustic signal is received by the second communication module from the first communication module,
wherein the second communication module is configured to transmit an acoustic signal with an indication of the delay to the first communication module,
wherein the first communication module comprises a signal processor configured to determine a further delay with which a received transmitted version of the acoustic signal from the second communication module is received, and
wherein the signal processor of the first communication module is configured to provide an estimate, as the information pertaining to the swimmer, of a relative velocity of the swimmer relative to the water from the difference between the delay and the further delay.

2. A communication system comprising:
a first underwater wearable device provided with a first communication module that comprises:
  a signal source configured to provide an input signal to be transmitted; and
  an acoustic transmitter configured to convert the input signal into an acoustic signal suitable for transmission in water and to transmit the acoustic signal; and
a second underwater wearable device provided with a second communication module that comprises:
  an acoustic receiver configured to receive a transmitted version of the acoustic signal and to convert the received transmitted version of the acoustic signal into a processable signal; and
  a signal processor configured to process the processable signal;
wherein the first underwater wearable device with the first communication module and the second underwater wearable device with the second communication module are configured to be worn at mutually distant locations of a swimmer,
wherein the communication system is configured to derive information pertaining to the swimmer from properties of the received transmitted version of the acoustic signal,
wherein the properties are due to behavior of the acoustic signal in water,
wherein the second communication module is configured to split the processable signal into a first signal component and a second signal component,
wherein the first signal component is associated with a component of the received transmitted version of the acoustic signal that is directly transmitted to the second communication module,
wherein the second signal component is associated with a component of the received transmitted version of the acoustic signal that is transmitted to the second communication module via a reflection, and
wherein the signal processor of the first communication module is configured to determine a difference in a time of arrival of the first signal component and the second signal component and to estimate as the information a depth of the swimmer from the difference.

3. A communication system comprising:
a first underwater wearable device provided with a first communication module that comprises:
  a signal source configured to provide an input signal to be transmitted; and
  an acoustic transmitter configured to convert the input signal into an acoustic signal suitable for transmission in water and to transmit the acoustic signal; and
a second underwater wearable device provided with a second communication module that comprises:

an acoustic receiver configured to receive a transmitted version of the acoustic signal and to convert the received transmitted version of the acoustic signal into a processable signal; and
a signal processor configured to process the processable signal;
wherein the first underwater wearable device with the first communication module and the second underwater wearable device with the second communication module are configured to be worn at mutually distant locations of a swimmer,
wherein the communication system is configured to derive information pertaining to the swimmer from properties of the received transmitted version of the acoustic signal,
wherein the properties are due to behavior of the acoustic signal in water,
wherein at least one of the first and second underwater wearable devices is configured to be worn at a wrist of a swimmer, and
wherein the communication module of at least an other one of the first and second underwater wearable devices is configured to:
determine a Doppler spread in the received transmitted version of the acoustic signal received from the communication module of the one of the first and second underwater wearable devices, and
determine, as the information pertaining to the swimmer, a type of stroke used by the swimmer from the determined Doppler spread.

4. The communication system according to claim 1, further configured to provide a distance between the first communication module and the second communication module and a controller for accordingly controlling a frequency range used for acoustic transmission to optimize path loss versus delay spread.

5. The communication system according to claim 1, comprising a further communication module that is provided in a housing configured to be positioned or mounted at a predetermined location.

6. An underwater wearable device provided with a communication module comprising:
a signal source configured to provide an input signal to be transmitted;
an acoustic transmitter configured to convert the input signal into an acoustic signal suitable for transmission in water and to transmit the acoustic signal;
an acoustic receiver configured to receive a transmitted version of an acoustic signal transmitted to the communication module of the underwater wearable device by a communication module of another species of the underwater wearable device worn by the swimmer at distance from the underwater wearable device and to convert the received transmitted version of the acoustic signal into a processable signal;
a signal processor configured to process the processable signal by:
deriving information pertaining to a swimmer wearing the underwater wearable device from the received transmitted version of the acoustic signal,
wherein the deriving information pertaining to the swimmer is performed based on properties of the received transmitted version of the acoustic signal that are due to the behavior of the acoustic signal in water, wherein the acoustic transmitter is configured to selectively assume one of at least a coherent transmission mode and a non-coherent transmission mode, and
wherein the acoustic transmitter is configured to select a transmission mode dependent on a detected type of swimming stroke of the swimmer.

7. The underwater wearable device according to claim 6, wherein the acoustic transmitter comprises a plurality of acoustic transmission elements arranged at mutually different positions on an outer surface of the underwater wearable device.

8. The underwater wearable device according to claim 6, further comprising one or more sensors that are communicatively coupled to the signal source, to enable acoustic transmission of sensor signals.

9. The communication system according to claim 2, further configured to provide a distance between the first communication module and the second communication module and a controller for accordingly controlling a frequency range used for acoustic transmission to optimize path loss versus delay spread.

10. The communication system according to claim 3, further configured to provide a distance between the first communication module and the second communication module and a controller for accordingly controlling a frequency range used for acoustic transmission to optimize path loss versus delay spread.

11. The communication system according to claim 5, further configured to provide a distance between the first communication module and the second communication module and a controller for accordingly controlling a frequency range used for acoustic transmission to optimize path loss versus delay spread.

12. The communication system according to claim 1, further comprising one or more sensors that are communicatively coupled to the signal source, to enable acoustic transmission of sensor signals.

13. The communication system according to claim 2, further comprising one or more sensors that are communicatively coupled to the signal source, to enable acoustic transmission of sensor signals.

14. The communication system according to claim 3, further comprising one or more sensors that are communicatively coupled to the signal source, to enable acoustic transmission of sensor signals.

15. The communication system according to claim 2, comprising a further communication module that is provided in a housing configured to be positioned or mounted at a predetermined location.

16. The communication system according to claim 3, comprising a further communication module that is provided in a housing configured to be positioned or mounted at a predetermined location.

* * * * *